United States Patent
Wang et al.

(10) Patent No.: US 12,205,383 B2
(45) Date of Patent: Jan. 21, 2025

(54) METHOD OF DETECTING TARGET OBJECTS IN IMAGES, ELECTRONIC DEVICE, AND STORAGE MEDIUM

(71) Applicant: HON HAI PRECISION INDUSTRY CO., LTD., New Taipei (TW)

(72) Inventors: Cheng-Feng Wang, Kaohsiung (TW); Hui-Xian Yang, New Taipei (TW); Li-Che Lin, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 407 days.

(21) Appl. No.: 17/747,140

(22) Filed: May 18, 2022

(65) Prior Publication Data
US 2023/0005280 A1 Jan. 5, 2023

(30) Foreign Application Priority Data
Jul. 1, 2021 (CN) .......................... 202110746165.3

(51) Int. Cl.
G06V 20/64 (2022.01)
G06V 10/22 (2022.01)
G06V 10/74 (2022.01)
G06V 10/75 (2022.01)
G06V 10/82 (2022.01)

(52) U.S. Cl.
CPC ............. *G06V 20/64* (2022.01); *G06V 10/22* (2022.01); *G06V 10/751* (2022.01); *G06V 10/761* (2022.01); *G06V 10/82* (2022.01)

(58) Field of Classification Search
None
See application file for complete search history.

(56) References Cited

U.S. PATENT DOCUMENTS

2019/0147597 A1* 5/2019 Song .................. G06T 7/246
382/103
2019/0304171 A1* 10/2019 Li ........................ G06T 15/30

FOREIGN PATENT DOCUMENTS

CN 112734747 A * 4/2021 ............... G06T 3/40

OTHER PUBLICATIONS

B. Zhang, H. Yang and Z. Yin, "A Region-Based Normalized Cross Correlation Algorithm for the Vision-Based Positioning of Elongated IC Chips," in IEEE Transactions on Semiconductor Manufacturing, vol. 28, No. 3, pp. 345-352, Aug. 2015, doi: 10.1109/TSM.2015.2430453 (Year: 2015).*

Q. Xiao, N. Zhang, F. Liand Y. Gao, "Object detection based on combination of local and spatial information," in Journal of Systems Engineering and Electronics, vol. 22, No. 4, pp. 715-720, Aug. 2011, doi: 10.3969/j. issn. 1004-4132.2011.04.023 (Year: 2011).*

(Continued)

*Primary Examiner* — Utpal D Shah
*Assistant Examiner* — Charles C L Penny
(74) *Attorney, Agent, or Firm* — ScienBiziP, P.C.

(57) ABSTRACT

A method of recognizing target objects in images obtains a detection image of a target object. A template image is generated according to the target object. The detection image is compared with the template image to obtain a comparison result. Candidate regions of the target object are determined in the detection image according to the comparison result. At least one target region of the target object is obtained from the candidate regions. The method detects target objects in images very rapidly.

17 Claims, 5 Drawing Sheets

(56) References Cited

OTHER PUBLICATIONS

A. D. Mandalia, R. Sudhakar, K. Ganesanand F. Hamano, "Low-leveland high-level correlation for image registration (IC inspection)," 1990 IEEE International Conference on Systems, Man, and Cybernetics Conference Proceedings, Los Angeles, CA, USA, 1990, pp. 206-208, doi: 10.1109/ICSMC.1990.142093 (Year: 1990).*

Rasmus Rothe, Matthieu Guillaumin, and Luc Van Gool. "Non-maximum suppression for object detection by passing messages between windows", Asian conference on computer vision, 2015 Springer, Cham 2015 pp. 1-16.

Network Document "Non Maximum Suppression" Published on Oct. 31, 2018, https://www.796t.com/content/1540990690.html.

* cited by examiner

METHOD OF DETECTING TARGET OBJECTS IN IMAGES, ELECTRONIC DEVICE, AND STORAGE MEDIUM

FIELD

The subject matter herein generally relates to image processing, specifically a method of detecting target objects in images, an electronic device, and a storage medium.

BACKGROUND

An object detection model can detect objects in images. In order to achieve accurate detection, a large amount of training data is used to train the object detection model. If new objects are to be detected, the object detection model needs to be retrained using new training data. The method uses a lot of memory of an electronic device, resulting in slow image detection.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
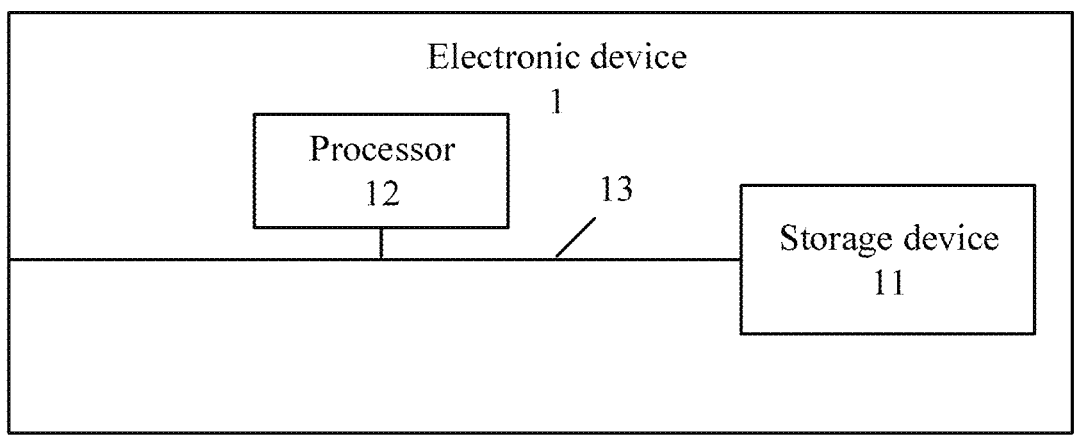
FIG. 1 is a block diagram of an electronic device implementing a method of detecting target objects in images in one embodiment of the present disclosure.

FIG. 1 is a block diagram of an electronic device implementing a method of detecting target objects in images in one embodiment of the present disclosure. The electronic device 1 includes, but is not limited to, a storage device 11, at least one processor 12, and a communication bus 13. The storage device 11 and at least one processor 12 are connected via the communication bus 13 or connected directly.

The electronic device 1 can be any electronic product that can interact with a user, such as a personal computer, a tablet computer, a smart phone, a personal digital assistant (PDA), a smart wearable device, etc. Those skilled in the art will understand that electronic device 1 is only an example, and does not constitute a limitation. Other examples of electronic device 1 may include more or fewer components than shown in FIG. 1, or combine some components, or have different components. For example, the electronic device 1 may further include an input/output device, a network access device, and the like.

Figure 2:
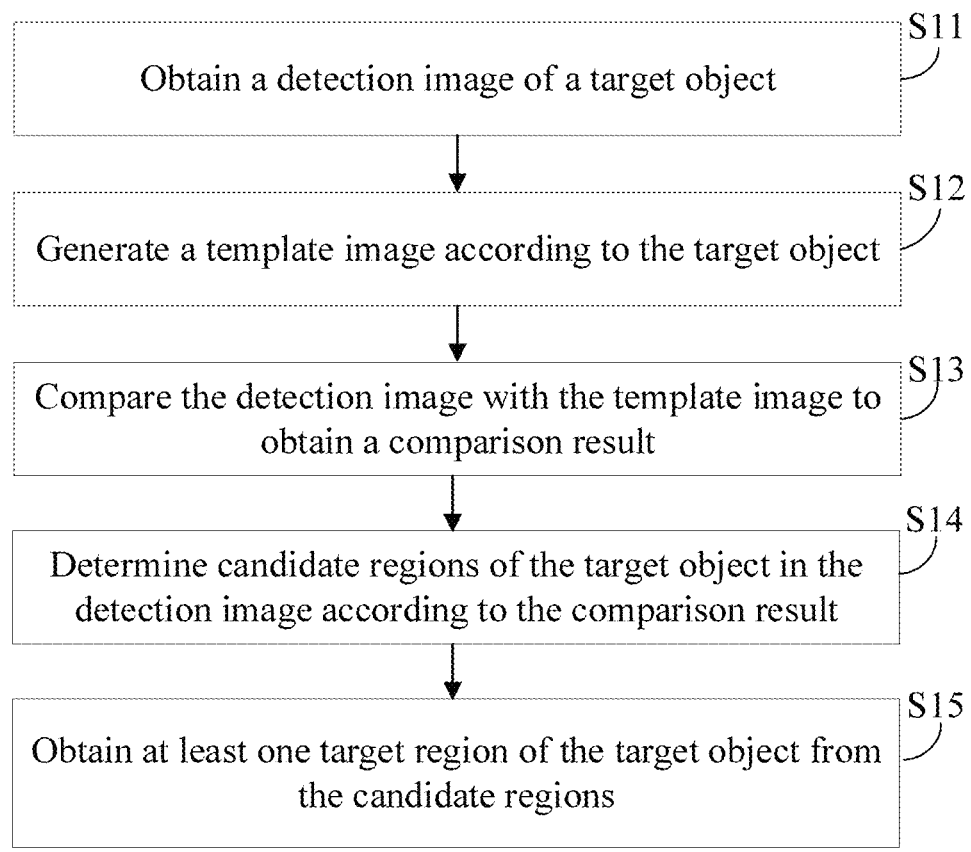
FIG. 2 is a flowchart of the method of detecting target objects in images provided in one embodiment of the present disclosure.

FIG. 2 is a flowchart of a method of detecting target objects in images in one embodiment. The method can detect target objects in images quickly. The method may be executed by an electronic device (e.g., electronic device 1 in FIG. 1). According to different requirements, the order of the blocks in the flowchart may be changed, and some blocks may be omitted.

In block S11, the electronic device obtains an image ("detection image") in which a target object is to be recognized and classified.

Figure 3:
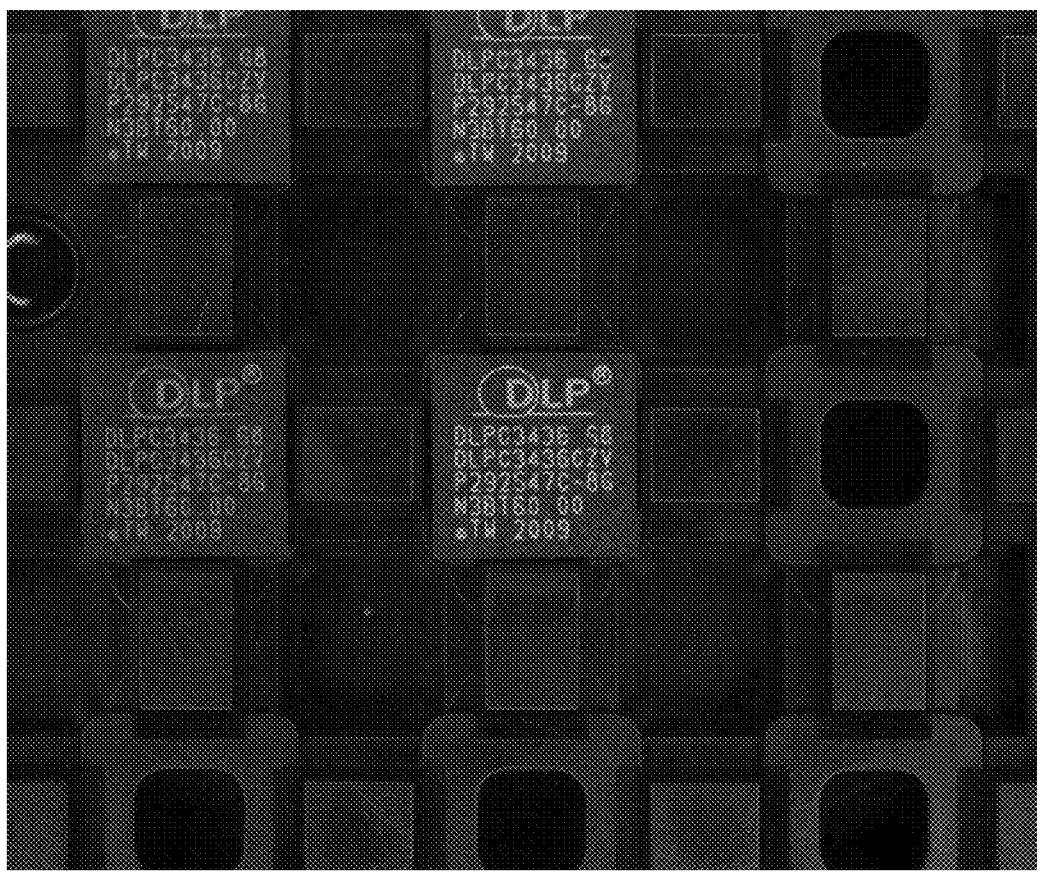
FIG. 3 shows a target object in a detection image.

The target object can be set according to actual requirements. The detection image is an image including the target object. FIG. 3 shows a target object in a detection image. In FIG. 3, the target object is an integrated circuit (IC) chip, and the detection image is an image of an IC carrier plate including the IC chip.

In block S12, the electronic device generates a template image according to the target object.

In one embodiment, the template image is a white image. A size of the template image is the same as a size of a bounding box of the target object.

The electronic device can determine the bounding box of the target object in the detection image, and obtain coordinates of four vertices of the bounding box. The bounding box is a rectangular. The electronic device calculates a length and a width of the bounding box according to the coordinates of the of four vertices of the bounding box, and generates the template image according to the length and the width.

By generating the template image, extraction of target regions of the target object from the detection image is made easier.

In block S13, the electronic device compares the detection image with the template image to obtain a comparison result.

In one embodiment, the electronic device may performs binarization on the detection image to obtain a binarized image. The electronic device slides the template image on the binarized image in a preset order until an edge of the template image is aligned with an edge of the binarized image, to obtain multiple sliding regions in the binarized image. The electronic device compares each of the sliding regions with the template image to obtain the comparison result.

In the binarization processing, a first threshold can be set. The first threshold can be between 0 and 255. The electronic device obtains a grayscale value corresponding to each pixel in the detection image, and determines whether the grayscale value is less than the first threshold. If the grayscale value is less than the first threshold, the electronic device adjusts the gray value to a first value (such as zero). If the gray value is greater than or equal to the first threshold, the electronic device adjusts the gray value to a second value (such as 255). It should be noted that the binarization converts the detection image into a binarized image (such as black and white). The target object in the detection image can be converted into a white area, and a background area can be converted into a black area.

The electronic device can set a size of step for the template image. The step size can be set according to the width of the bounding box of the target object. The electronic device determines whether the template image exceeds the edge of the binarized image. If the template image exceeds the edge of the binarized image, the electronic device slides the template image in an opposite direction until the edge of the template image is aligned with the edge of the binarized image. Multiple sliding regions in the binarized image are obtained.

The electronic device can calculate a similarity between each of the sliding regions and the template image. For each sliding region, the electronic device can obtain pixels ("first pixels") in the template image, and obtain pixels ("second pixels") in the sliding region. Each of the second pixels corresponds to one of the first pixels. The electronic device can calculate a difference of squares of each first pixel point and a corresponding second pixel point, summing all differences of squares to obtain the similarity. It should be noted that the smaller the summation of the differences of squares, the higher the similarity, and the larger the summation of the differences of squares, the smaller will be the similarity. For example, a summation of the differences of squares of sliding region A is 2, and a summation of the differences of squares of sliding region B is 10 means that a similarity of the sliding region A is greater than a similarity of the sliding region B.

Figure 4:
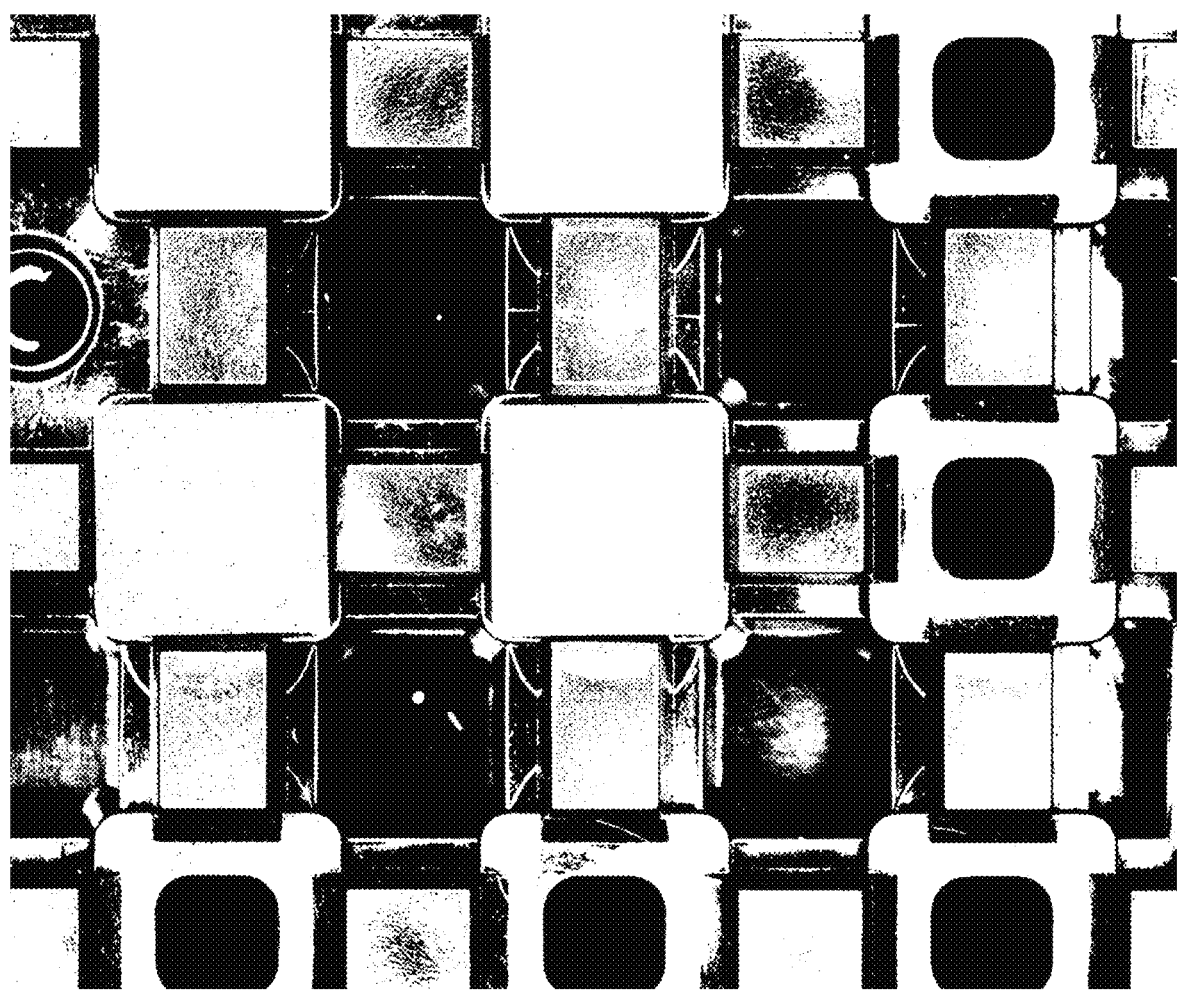
FIG. 4 shows a binarized image based on the detection image of FIG. 3.

In the example of FIG. 3, the detection image is an image of an IC carrier plate, and the target object is an IC chip on the IC carrier plate. The electronic device generates a white template image with same size as the IC chip. Next, the electronic device converts the image of the IC carrier plate into a binarized image. FIG. 4 shows a binarized image based on the detection image of FIG. 3. In the binarized image of FIG. 4, a region of the IC chip becomes a white area, and other regions become black areas. The electronic device slides the template image on the binarized image to obtain multiple sliding regions. White pixels in the sliding regions and the template image are set to 0, and black pixels in the sliding regions and the template image are set to 1. For each sliding region, the electronic device calculates a summation of the differences of squares between pixels in the template image and pixels in the sliding region. The similarity can therefore be calculated as 1/(1+(summation of the differences of squares). When the summation of the differences of squares is 0, the similarity is 1.

In one embodiment, a region of the target object is converted into a white region after binarization. The region of the target object can be extracted according to the similarity with the white template image.

In block S14, the electronic device determines candidate regions of the target object in the detection image according to the comparison result.

In one embodiment, a sliding region which has a higher similarity with the template image means that it is closer to the region of the target object.

In one embodiment, the electronic device determines whether the similarity is greater than a second threshold, and sets the sliding region corresponding to the similarity as a candidate region of the target object when the similarity is greater than the second threshold.

Figure 5:
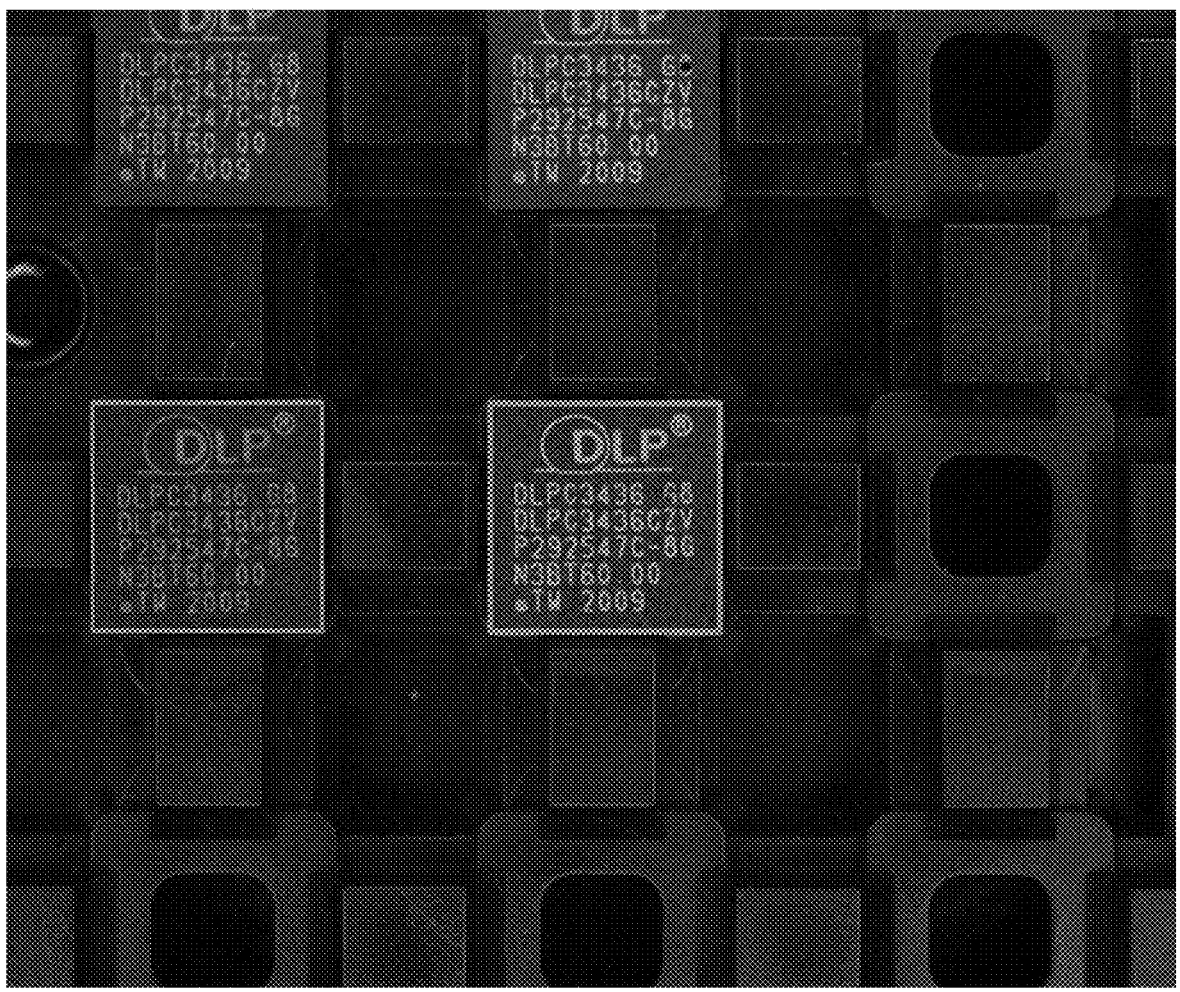
FIG. 5 shows candidate regions of the target object in the detection image of FIG. 3.

For example, the second threshold is ⅕, and similarities obtained in block S13 are 1, ½, ⅙, ⅛, and 1/10. According to the second threshold, sliding regions corresponding to 1 and ½ can be determined as candidate regions of the target object. FIG. 5 shows a candidate region of the target object in the detection image. FIG. 5 shows candidate regions of the target object in the detection image of FIG. 3. In FIG. 5, each candidate region is framed by a white frame.

In the method, the candidate regions of the target object can be obtained using the template image. This method reduces CPU usage and improves the detection speed of target objects.

In block S15, the electronic device obtains at least one target region of the target object from the candidate regions.

Two sliding regions may overlap, and the candidate regions may overlap. Therefore, redundant candidate regions need to be removed.

In one embodiment, the electronic device may perform non-maximum suppression (NMS) on the candidate region to obtain the at least one target region of the target object.

The electronic device may sort the candidate regions according to the similarities, in descending order. Starting from a second candidate region, the electronic device selects a candidate region (the electronic device successively selects a second candidate region, a third candidate region, a fourth candidate region, . . . , and a last candidate region). For each selected candidate region, the electronic device calculates an overlap ratio of the selected candidate region and a first candidate region, and determines whether the overlap ratio is greater than a third threshold. If the overlap ratio is greater than or equal to the third threshold, the electronic device deletes the selected candidate region from the candidate regions as being redundant. If the overlap ratio is less than the third threshold, the electronic device retains the selected candidate region in the candidate regions. The first candidate region corresponds to a first similarity. The second candidate region corresponds to a second similarity. The third candidate region corresponds to a third similarity. The fourth candidate region corresponds to a fourth similarity. The last candidate region corresponds to a minimum similarity.

In one embodiment, the electronic device may obtain the at least one target region of the target object from the candidate regions as follows (S501-S510).

S501, the electronic device stores candidate regions of the target object in a first database.

S502, the electronic device sorts in descending order the candidate regions according to a similarity between each of the candidate regions and the template image.

S503, starting from a second candidate region in the first database, the electronic device selects a candidate region.

S504, the electronic device calculates an overlap ratio between the selected candidate region and a first candidate region in the first database.

S505, the electronic device determines whether the overlap ratio is greater than the third threshold.

S506, if the overlap ratio is greater than or equal to the third threshold, the electronic device deletes the selected candidate region from the first database for redundancy.

S507, if the overlap ratio is less than the third threshold, the electronic device retains the selected candidate region in the first database.

S508, the electronic device moves the first candidate region to a second database.

S509, the electronic device determines whether the first database is empty. The process goes to block S503 if the first database is not empty. S503 to S508 are repeated until the first database is empty.

S510, the electronic device set candidate regions in the second database as the target regions of the target object.

For example, there are four candidate regions, denoted as A, B, C, and D. The four candidate regions are sorted as D>C>B>A. The third threshold is 0.3. At first, A, B, C, and D are stored in the first database, and D is selected as the first candidate region. An overlap ratio of C and D is 0.6, an overlap ratio of B and D is 0.1, and an overlap ratio of A and D is 0. Therefore, C is deleted from the first database, A and B are retained in the first data base, and D is moved from the first database to the second database. Next, B is selected as the first candidate region. An overlap ratio of A and B is 0.4.

Therefore, A is deleted from the first database, and B is moved to the second database. The first database is now empty and B and D are set as the target regions of the target object.

By obtaining target regions with a high similarity to the template image and deleting candidate regions with a high overlap rate with the target regions, the detection accuracy of the target object is improved.

In FIG. 1, a computer program (such as an image detection system) may be stored in the storage device 11 and executable by the processor 12. The processor 12 may execute the computer program to implement the blocks in the method described above, such as the blocks S11 to S15 in FIG. 1.

The storage device 11 may be an internal memory of the electronic device 1, that is, a memory built into the electronic device 1. The storage device 11 may also be an external memory of the electronic device 1, that is, a memory externally connected to the electronic device 1.

The storage device 11 is used for storing program codes and various data, and accesses programs and data during the operation of the electronic device 1.

The storage device 11 may include a storage program area and a storage data area. The storage program area may store an operating system, and programs required by at least one function, etc.; the storage data area may store data and the like created in the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 12 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

In an exemplary embodiment, the computer program may be divided into one or more modules, and the one or more modules are stored in the storage device 11 and executed by the processor 12 to complete the method of the present disclosure. The one or more modules can be a series of computer-readable instruction segments capable of performing specific functions, and the instruction segments are used to describe execution processes of the computer program in the electronic device 1.

When the modules integrated in the electronic device 1 are implemented in the form of software functional units and used as independent units, they can be stored in a non-transitory readable storage medium. According to this understanding, all or part of the processes in the method of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the electronic device 1 may also include a power source (such as a battery) for supplying power to various components. The power source may be logically connected to the at least one processor 12 through a power management device, so as to realize functions such as charging, discharging, and power consumption management. The power supply may also include direct current or alternating current power supplies, recharging devices, power failure detection circuits, power converters or inverters, and power status indicators. The electronic device 1 may also include various sensors, BLUETOOTH modules, WI-FI modules, etc.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method of detecting target objects in images, comprising:
   obtaining a detection image of a target object,
   generating a template image according to the target object, the template image is a white image, and a size of the template image is same as a size of a bounding box of the target object;
   comparing the detection image with the template image to obtain a comparison result, wherein comparing the detection image with the template image comprises: performing binarization on the detection image to obtain a binarized image; sliding the template image on the binarized image in a preset order until an edge of the template image is aligned with an edge of the binarized image, to obtain a plurality of sliding regions in the binarized image; and comparing each of the sliding regions with the template image;
   determining candidate regions of the target object in the detection image according to the comparison result; and
   obtaining at least one target region of the target object from the candidate regions.

2. The method of claim 1, wherein performing binarization on the detection image comprises:
   setting a first threshold;
   obtaining a grayscale value corresponding to each pixel in the detection image; and
   adjusting the gray value according to the first threshold.

3. The method of claim 2, wherein adjusting the gray value according to the first threshold comprises:
   determining whether the gray value is less than the first threshold;
   adjusting the gray value to a first value when the gray value is smaller than the first threshold; and
   adjusting the gray value to a second value when the gray value is greater than or equal to the first threshold.

4. The method of claim 3, wherein comparing each of the sliding regions with the template image comprises:
   calculating a similarity between each of the sliding regions and the template image.

5. The method of claim 4, wherein determining candidate regions of the target object in the detection image according to the comparison result comprises:
   determining whether the similarity is greater than a second threshold; and
   setting the sliding region corresponding to the similarity as a candidate region of the target object when the similarity is greater than the second threshold.

6. The method of claim 1, wherein obtaining at least one target region of the target object from the candidate regions comprises:
   performing non-maximum suppression (NMS) on the candidate region to obtain the at least one target region of the target object.

7. The method of claim 6, wherein performing non-maximum suppression (NMS) on the candidate region to obtain the at least one target region of the target object comprises:
   sorting the candidate regions according to a similarity between each of the candidate regions and the template image in descending order;
   selecting a candidate region starting from a second candidate region, calculating an overlap ratio of selected candidate region and a first candidate region, the first candidate region corresponding to a first similarity, and the second candidate region corresponding to a second similarity;
   determining whether the overlap ratio is greater than a third threshold; and
   deleting the selected candidate region from the candidate regions when the overlap ratio is greater than or equal to the third threshold, and retaining the selected candidate region in the candidate regions when the overlap ratio is less than the third threshold.

8. An electronic device comprising:
   at least one processor; and
   a storage device storing computer-readable instructions, which when executed by the at least one processor, cause the at least one processor to:
   obtain a detection image of a target object;
   generate a template image according to the target object, the template image is a white image, and a size of the template image is same as a size of a bounding box of the target object;
   compare the detection image with the template image to obtain a comparison result, perform binarization on the detection image to obtain a binarized image; slide the template image on the binarized image in a preset order until an edge of the template image is aligned with an edge of the binarized image; to obtain a plurality of sliding regions in the binarized image; and compare each of the sliding regions with the template image;
   determine candidate regions of the target object in the detection image according to the comparison result; and
   obtain at least one target of the target object from the candidate regions.

9. The electronic device of claim 8, wherein the at least one processor is further caused to:
   set a first threshold;
   obtain a grayscale value corresponding to each pixel in the detection image; and
   adjust the gray value according to the first threshold.

10. The electronic device of claim 9, wherein the at least one processor is further caused to:
    determine whether the gray value is less than the first threshold;
    adjust the gray value to a first value when the gray value is smaller than the first threshold; and
    adjust the gray value to a second value when the gray value is greater than or equal to the first threshold.

11. The electronic device of claim 10, wherein the at least one processor is further caused to:
    calculate a similarity between each of the sliding regions and the template image;
    determine whether the similarity is greater than a second threshold; and
    set the sliding region corresponding to the similarity as a candidate region of the target object when the similarity is greater than the second threshold.

12. The electronic device of claim 8, wherein the at least one processor is further caused to:
    sort the candidate regions according to a similarity between each of the candidate regions and the template image in descending order;

select a candidate region starting from a second candidate region, calculate an overlap ratio of selected candidate region and a first candidate region, the first candidate region corresponding to a first similarity, and the second candidate region corresponding to a second similarity;

determine whether the overlap ratio is greater than a third threshold; and delete the selected candidate region from the candidate regions when the overlap ratio is greater than or equal to the third threshold, and retain the selected candidate region in the candidate regions when the overlap ratio is less than the third threshold.

13. A non-transitory storage medium having stored thereon computer-readable instructions that, when the computer-readable instructions are executed by a processor to implement the following method:

obtaining a detection image of a target object;

generating a template image according to the target object, the template image is a white image, and a size of the template image is same as a size of a bounding box of the target object;

comparing the detection image with the template image to obtain a comparison result, wherein comparing the detection image with the template image comprises: performing binarization on the detection image to obtain a binarized image, sliding the template image on the binarized image in a preset order until an edge of the template image is aligned with an edge of the binarized image; to obtain a plurality of sliding regions in the binarized image; and comparing each of the sliding regions with the template image;

determining candidate regions of the target object in the detection image according to the comparison result; and obtaining at least one target of the target object from the candidate regions.

14. The non-transitory storage medium of claim 13, wherein performing binarization on the detection image comprises:

setting a first threshold;

obtaining a grayscale value corresponding to each pixel in the detection image; and adjusting the gray value according to the first threshold.

15. The non-transitory storage medium of claim 14, wherein adjusting the gray value according to the first threshold comprises:

determining whether the gray value is less than the first threshold;

adjusting the gray value to a first value when the gray value is smaller than the first threshold; and adjusting the gray value to a second value when the gray value is greater than or equal to the first threshold.

16. The non-transitory storage medium of claim 15, wherein comparing each of the sliding regions with the template image comprises:

calculating a similarity between each of the sliding regions and the template image; and determining candidate regions of the target object in the detection image according to the comparison result comprises:

determining whether the similarity is greater than a second threshold; and setting the sliding region corresponding to the similarity as a candidate region of the target object when the similarity is greater than the second threshold.

17. The non-transitory storage medium of claim 13, wherein obtaining at least one target region of the target object from the candidate regions comprises:

sorting the candidate regions according to a similarity between each of the candidate regions and the template image in descending order;

selecting a candidate region starting from a second candidate region, calculating an overlap ratio of selected candidate region and a first candidate region, the first candidate region corresponding to a first similarity, and the second candidate region corresponding to a second similarity;

determining whether the overlap ratio is greater than a third threshold; and deleting the selected candidate region from the candidate regions when the overlap ratio is greater than or equal to the third threshold, and retaining the selected candidate region in the candidate regions when the overlap ratio is less than the third threshold.

* * * * *